United States Patent
Wong

(10) Patent No.: US 7,307,664 B2
(45) Date of Patent: Dec. 11, 2007

(54) METHOD AND APPARATUS FOR DEINTERLACING INTERLEAVED VIDEO

(75) Inventor: Daniel W. Wong, Thornhill (CA)

(73) Assignee: ATI Technologies Inc., Markham, Ontario (CA)

( * ) Notice: Subject to any disclaimer, the term of this patent is extended or adjusted under 35 U.S.C. 154(b) by 571 days.

(21) Appl. No.: 10/847,545

(22) Filed: May 17, 2004

(65) Prior Publication Data

US 2005/0253963 A1    Nov. 17, 2005

(51) Int. Cl.
*H04N 7/01* (2006.01)
(52) U.S. Cl. .................................. 348/452; 348/448
(58) Field of Classification Search ................ 348/448, 348/441, 451, 452, 458, 459; *H04N 7/01, H04N 11/20*
See application file for complete search history.

(56) References Cited

U.S. PATENT DOCUMENTS

| | | | |
|---|---|---|---|
| 5,153,719 A | 10/1992 | Ibenthal | |
| 5,521,644 A | 5/1996 | Sezan et al. | |
| 5,682,205 A | 10/1997 | Sezan et al. | |
| 6,487,304 B1 | 11/2002 | Szeliski | |
| 6,570,624 B2 | 5/2003 | Cornog et al. | |
| 6,788,347 B1 * | 9/2004 | Kim et al. | 348/441 |

FOREIGN PATENT DOCUMENTS

| | | |
|---|---|---|
| EP | 0 883 298 A2 | 12/1998 |
| EP | 1 422 929 A2 | 5/2004 |

OTHER PUBLICATIONS

PCT International Search Report, International App. No. PCT/IB2005/001318, Filing Date May 16, 2005.
Kalevo et al., Deinterlacing of Video Signals Using Nonlinear Interpolation with Simple Motion Compensation, Proceedings of IEEE Workshop, Jan. 1993.
Yoshida, Junko; "Philips new chip said to remove LCD TV artifacts"; EE Times; Jul. 8, 2003; pp. 1-2; www.eetimes.com/sys/news/OEG20030708S0017.
Co-pending U.S. Appl. No. 10/661,181, filed Sep. 11, 2003, Daniel W. Wong, et al.

* cited by examiner

*Primary Examiner*—Sherrie Hsia
(74) *Attorney, Agent, or Firm*—Vedder, Price, Kaufman & Kammholz, P.C.

(57) ABSTRACT

A method of deinterlacing interlaced fields of video for display in a progressive display device includes providing at least one candidate motion vector per scan line and determining, at least one final motion vector per scan line of interlaced video, for use in deinterlacing the interlaced fields, by iteratively changing the at least one candidate motion vector per scan line based on pixel intensities from each of a plurality of same polarity fields at locations along a single dimension.

17 Claims, 4 Drawing Sheets

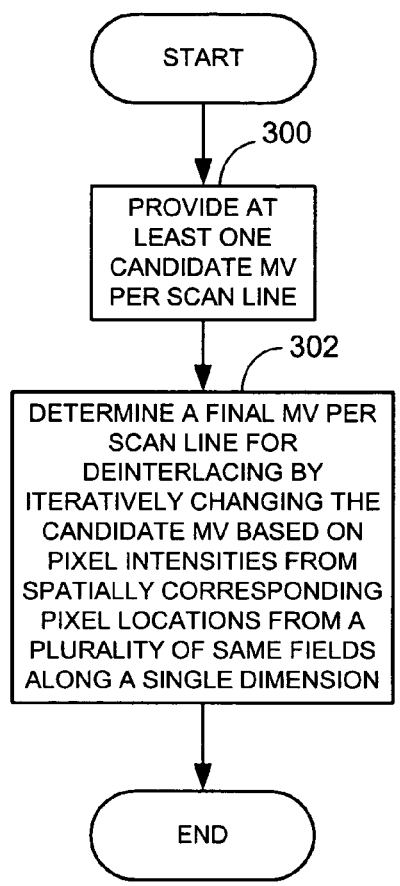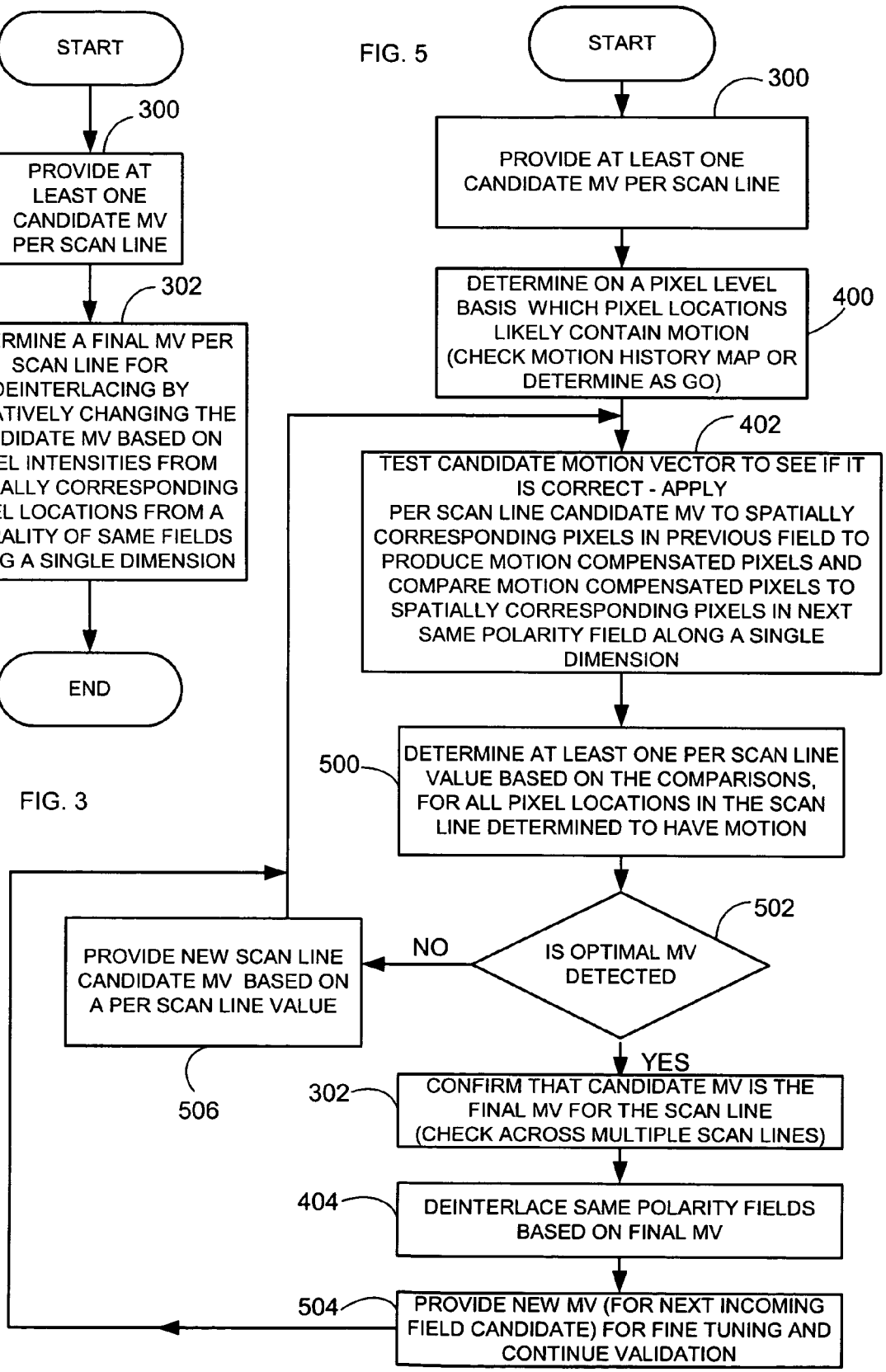

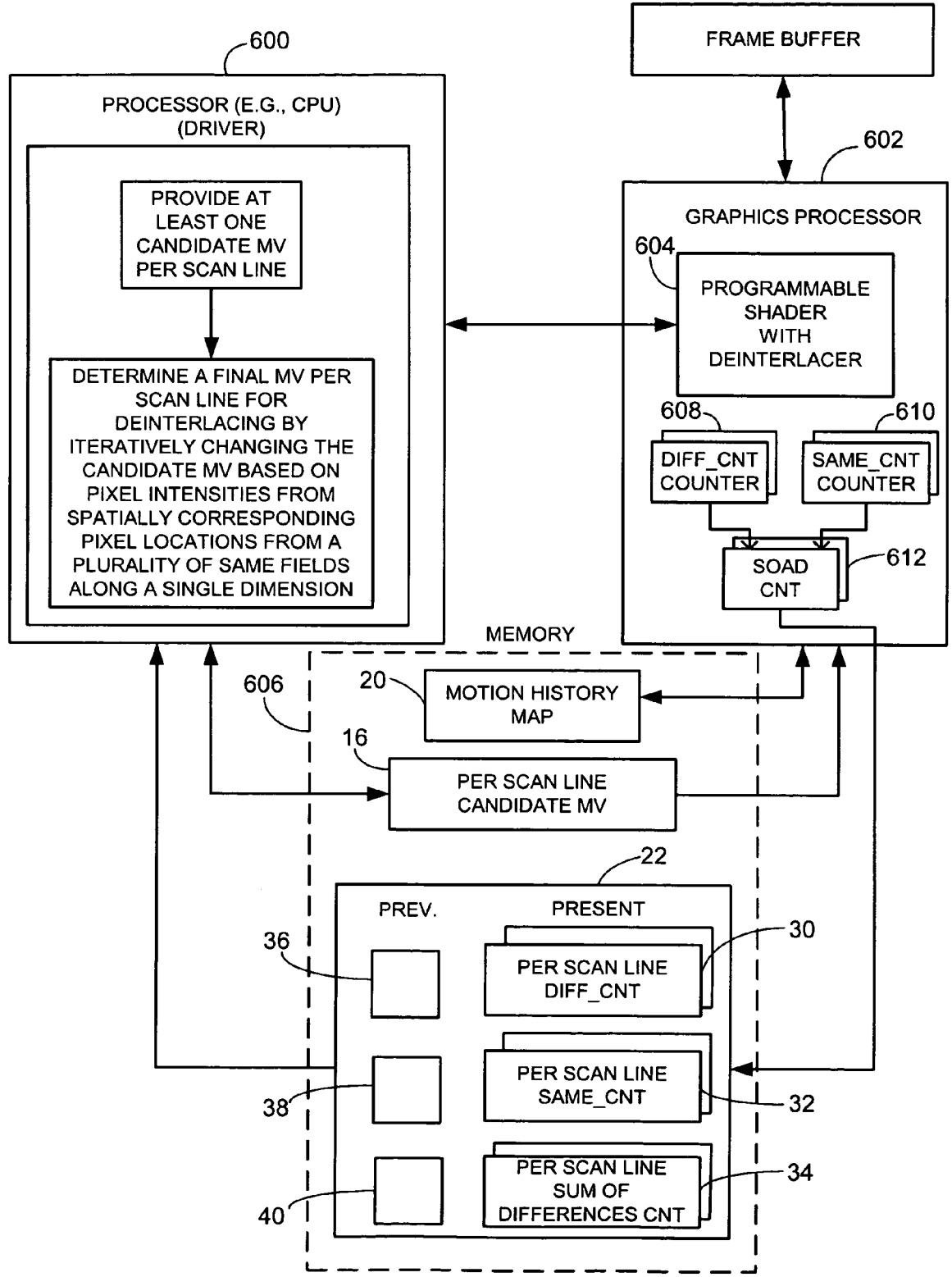

METHOD AND APPARATUS FOR DEINTERLACING INTERLEAVED VIDEO

FIELD OF THE INVENTION

The invention relates generally to methods and apparatus for deinterlacing interlaced fields of video for display on progressive display devices and more particularly to methods and apparatus that deinterlace interlaced fields of video based on motion vector information.

BACKGROUND OF THE INVENTION

For computer monitors that are mostly non-interlaced or progressive type display devices, video images or graphic images must be displayed by sequentially displaying each successive line of pixel data sequentially for a frame of an image. In contrast, inter-laced display devices, such as conventional television displays, typically display images using even and odd line interlacing.

The process of producing one progressive frame on every incoming interlaced field is called de-interlacing. When such interlaced signals are received for display in a progressive display, such as a computer display or other suitable display, picture quality problems can arise especially when motion is occurring in the picture where inferior methods of de-interlacing are used.

Two interpolation techniques are often involved in de-interlacing, these are temporal interpolation and spatial interpolation. Temporal interpolation creates the missing pixels using pixels that were incorrect in time but have the correct spatial coordinates. Temporal interpolation (e.g. weave) is typically best suited if the video sequence consist of static images but does not work well with moving video. Spatial interpolation (e.g. bob) creates missing pixels using pixels that are correct in time but have incorrect spatial coordinates. Techniques vary from simply averaging the pixels above and below the missing pixel to more elaborate methods that utilize many nearby pixels in order to derive edge orientation and reproduce edges without jagged artifacts. It is also known to control a blend of spatial versus temporal interpolation along, for example, edges of detected motion.

In the deinterlacing process, interlaced video with moving ticker symbols, such as those that are scrolled across the bottom or top of a display screen to indicate stock market ticker symbols and stock prices, can suffer from resolution degradation due to the blending from neighboring pixels to fill the missing pixels in the current field. Furthermore, the degradation is highly noticeable because viewers are interested at tracking the text in motion. One type of deinterlacing technique, sometimes referred to as motion adaptive deinterlacing, does not use motion vector detection, it uses multiple fields and attempts to determine the presence of movement, but not the direction or speed of movement for example. In addition, another technique sometimes referred to as motion correct deinterlacing attempts to detect the direction of motion and the speed of the motion, however it is typically done on a block by block basis. Such motion estimation techniques can require large amount of computation. Other techniques may employ, for example, the use of a two dimensional search window to get a coarse level of motion detection such as, for example, starting with a 16×16 pixel block and if motion is detected within the block then an iterative approach searches for motion in 4×4 pixel sub-blocks. Again, this technique can be expensive to implement and can take large amount of time due to the iterative nature of the process. Also one or more of the above techniques may attempt to analyze motion in an entire field or frame whereas horizontal moving ticker symbols may only be located in the upper or lower one third of a viewing area.

Accordingly, a need exists for a method and apparatus that overcomes one or more of the above problems.

DETAILED DESCRIPTIONS OF THE DRAWINGS

The invention will be more readily understood in view of the following description when accompanied by the below figures and wherein like reference numerals represent like elements:

FIG. 3 is a flow chart illustrating one example of a method for deinterlacing interlaced fields of video in accordance with one embodiment of the invention;

FIG. 5 is a flow chart illustrating one example of a method for deinterlacing interlaced fields of video in accordance with one embodiment of the invention; and FIG. 6 is a block diagram illustrating another embodiment of a apparatus for deinterlacing interlaced fields of video in accordance with one embodiment of the invention.

DETAILED DESCRIPTION OF THE PREFERRED EMBODIMENT

Figure 2:
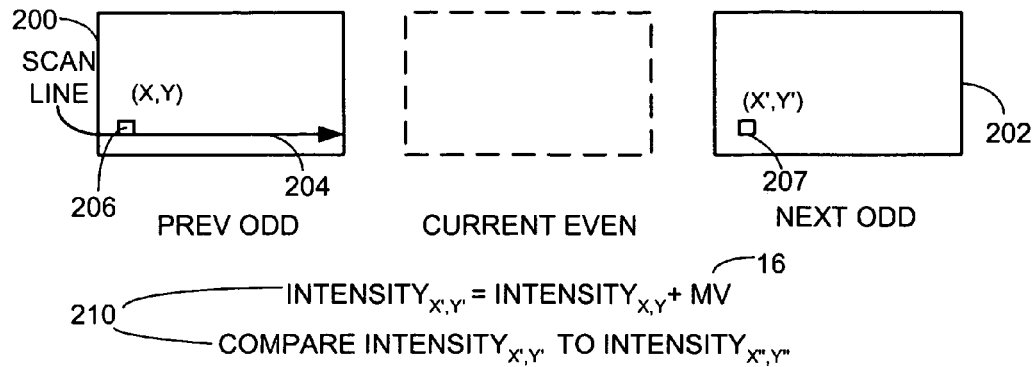
FIG. 2 is a diagram illustrating a horizontal scan line and previous and next same polarity fields.

Briefly, a method of deinterlacing interlaced fields of video for display in a progressive display device includes providing at least one candidate motion vector per scan line and determining, at least one final motion vector per scan line of interlaced video, for use in deinterlacing the interlaced fields, by iteratively changing the at least one candidate motion vector per scan line based on pixel intensities from each of a plurality of same polarity fields at locations along a single dimension. For example, a candidate motion vector is selected and applied to pixels that are determined to have motion in a field. The per scan line candidate motion vector is the same motion vector for all pixels in the same scan line. When the motion vector is applied to the pixel information it is analyzed to see if it is a suitable motion vector and if not, at least one different candidate motion vector is selected and tested every time a new field is received until a final motion vector is determined and that final motion vector is then used to deinterlace the interlaced fields. As such iteratively changing the candidate motion vector is done based on pixel intensities from each of a plurality of same polarity fields and such is either in the horizontal or vertical dimension. Such a method can reduce the complexity over a two dimensional type approach.

For example, the method may assume one directional movement and accumulate motion test results on for example, a row by row basis if horizontal motion is assumed. Once a final per scan line motion vector is selected, missing scan lines are provided by deriving pixel movements between for example previous and next same polarity fields. As such the technique identifies movements at scan line resolution and can detect, for example, horizontal motion (or vertical motion) on a line by line (or column by column) basis and uses a type of trial and error approach where one per scan line motion candidate is tested at a time. The technique spreads the trial and error process across multi-field times which in some instances can take longer for the technique to detect and lock in for large motion vectors. However, a very small overhead may be used to implement the apparatus and method and improve the resolution of horizontal scrolling text or other unidirectional moving information. In one embodiment, an apparatus for deinterlacing interlaced fields includes a frame buffer that stores the same polarity fields and control logic which carries out the operation as set forth above.

The control logic applies, for example, a per scan line candidate motion vector to spatially corresponding pixels in one dimension in for example a previous field, to produce motion vector compensated pixels associated with a second field, such as a next field of the same polarity. Resulting motion compensated pixels are compared to pixel intensities associated with spatially corresponding pixels in a next same polarity field to produce data, such as suitable statistics, on a per scan line basis to determine the validity of the candidate motion vector. In one example, multiple counters for each scan line are used to track whether or not the candidate motion vector, when applied to pixel intensities, is within a suitable range. The apparatus for example determines at least a per scan line value, such as one of a difference count, a same count or a sum of absolute difference value, based on the comparison of the produced motion compensated pixels, to original pixel intensities (or previously motion compensated pixels) associated with spatially corresponding pixels in the next same polarity field. A new candidate motion vector is then provided in response to the per scan line value that has been determined if the new candidate motion vector would be a better estimation.

For example, in one embodiment, the method includes providing at least one candidate motion vector per scan line and generating a motion history map that indicates which pixels in a field are detected to have motion. For each scan line, the method tests corresponding motion vectors on moving pixels as defined in the motion history map. A final motion vector per scan line is determined for deinterlacing by iteratively changing the candidate motion vectors based on pixel intensities from spatially corresponding pixel locations from a plurality of same fields along a single dimension. Once the suitable final motion value has been determined, the method includes generating the missing pixels for the current field by applying of the deinterlacing process based on the final per scan line motion vector and motion history map.

Figure 1:
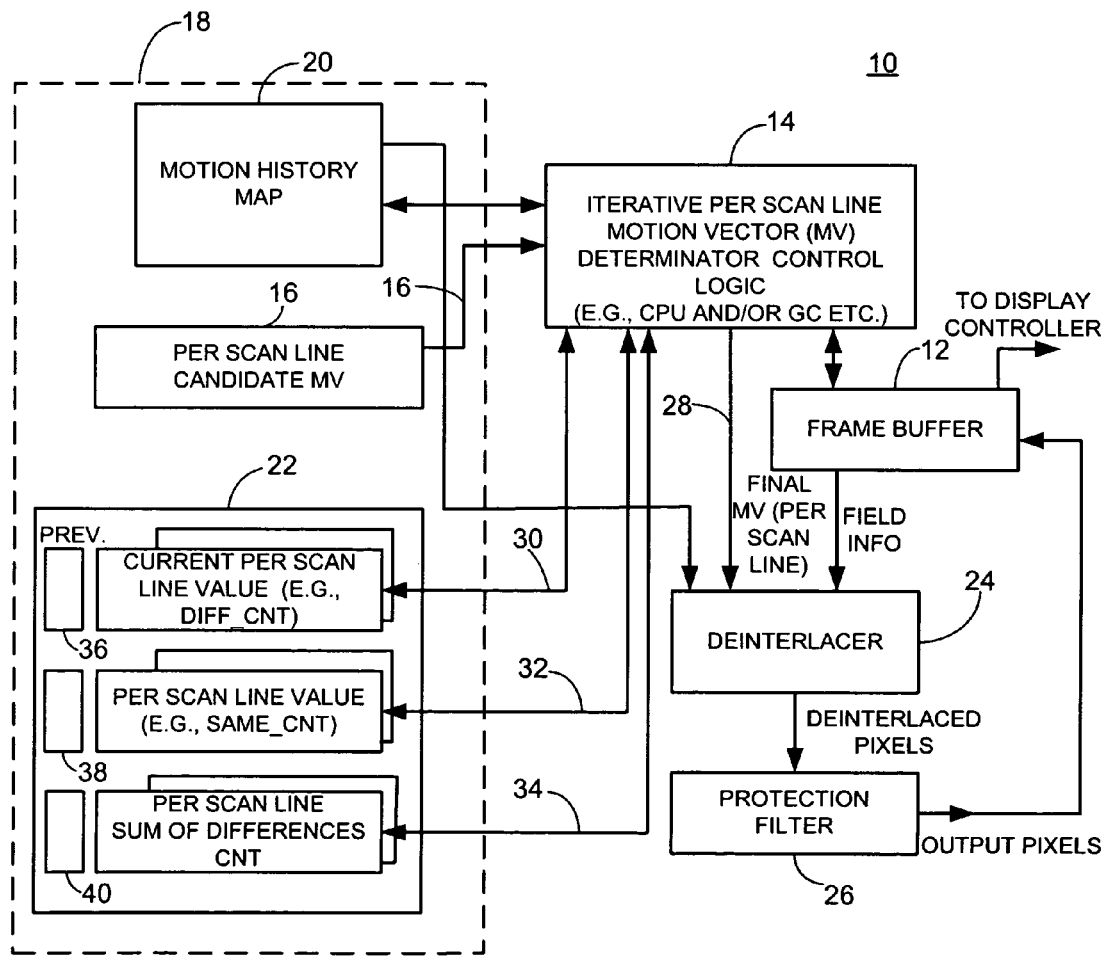
FIG. 1 is a block diagram illustrating one example of an apparatus for deinterlacing interlaced fields of video in accordance with one embodiment of the invention.

FIG. 1 is a block diagram illustrating one example of an apparatus 10 for deinterlacing interlaced fields of video for display in a progressive display device. In this example, the apparatus 10 includes a frame buffer 12 that contains at least a plurality of same polarity fields. Also referring to FIG. 2, the same polarity fields may be, for example, a previous odd field 200 and a next odd field 202 although it will be recognized that the operations described herein can be applied to even fields as well. A current field may also be stored in the frame buffer as well as any other field information or any other information as desired. The apparatus 10 also includes control logic 14 that performs iterative per scan line motion vector determination as further described herein. The control logic 14 is operative to provide, for example, at least one candidate motion vector per scan line by, for example, obtaining a candidate motion vector 16 from memory 18. Memory 18 may be any suitable memory element including but not limited to RAM, ROM, distributed memory, or any suitable storage structure, and may also include for example a motion history map 20 and a plurality of values from counters or accumulators for each scan line are also stored in memory as further described below. The apparatus 10 also includes deinterlacing logic 24 and if desired a protection filter 26. The control logic 14, deinterlacer 24 and protection filter 26 may be implemented using any suitable combination of hardware, software or firmware and for purposes of discussion only, may be implemented through the combination of a host processor and graphics controller. However, it will be recognized that the functions as described herein may be implemented using one or more suitably programmed processing devices, state machines, discrete logic, or any other suitable structure.

The control logic 14 receives or obtains suitable field information from frame buffer 12 and provides a candidate motion vector 16 per scan line and determines a final motion vector 26 per scan line for use by the deinterlacer 24 to deinterlace interlaced fields of video. The control logic 14 iteratively changes the candidate motion vector 16 based on tests of motion compensated pixel intensities from each of a plurality of same polarity fields at locations along a single dimension such as a horizontal dimension or alternatively, a vertical direction. This can reduce the complexity over two dimensional motion correct deinterlacing techniques.

For example, referring also to FIG. 2, a horizontal scan line 204 is shown containing a pixel location 206 and pixel location 207 represents the pixel at a corresponding location in a same polarity field. A candidate motion vector 16 is applied to the pixel value at location 207 in the horizontal direction to obtain a produced motion compensated pixel 210. Per scan line motion vector candidates are iteratively changed until a final motion vector is selected for deinterlacing.

For example, on the arrival of an incoming field such as a next field, the control logic 14 obtains a motion vector candidate 16 for every single scan line (at field resolution) and effectively walks pixels in the same polarity fields ("next" and "previous"), scan line after scan line to determine the final optimal motion vectors for the generation of missing pixels in the opposite polarity field (a current even field).

The frame buffer 12 includes data that represents a previous field and data representing a next field of the same polarity such pixel intensity information for fields 200 and 202.

Also referring to FIG. 3, a method for deinterlacing interlaced fields of video will be described in connection with FIG. 1 although it will be understood that any suitable structure may carry out these steps. As shown in block 300, the method includes providing at least one candidate motion vector per scan line. For example, the control logic 14 selects a per scan line candidate motion vector 16 for each scan line in a field. This may be done, for example, by reusing a same motion vector used in a previous iteration of the process or on power up, the control logic 14 may be programmed to start with a predefined per scan line motion vector as desired as an initial candidate motion vector. Each scan line utilizes the same motion vector which is applied to only those pixels that have been determined to contain motion. Pixels are determined to contain motion through any suitable technique such as use of a motion history map 20 which may utilize a technique, incorporated by reference in its entirety, as described in co-pending application Ser. No. 10/661,181, METHOD AND DE-INTERLACING APPARATUS THAT EMPLOYS RECURSIVELY GENERATED MOTION HISTORY MAPS, Daniel W. Wong, et al., or any other suitable pixel motion determination mechanism. For example, pixels in a scan line may appear to be moving whereas other pixels may not, hence the motion vector is only applied to those pixels determined to have motion as for example indicated in the motion history map.

As shown in block 302, the method includes determining a final motion vector per scan line for use by the deinterlacer 24 by iteratively changing the candidate motion vector 16 based on pixel intensities from spatially corresponding pixel locations from two or more same polarity fields along a single dimension.

Figure 4:
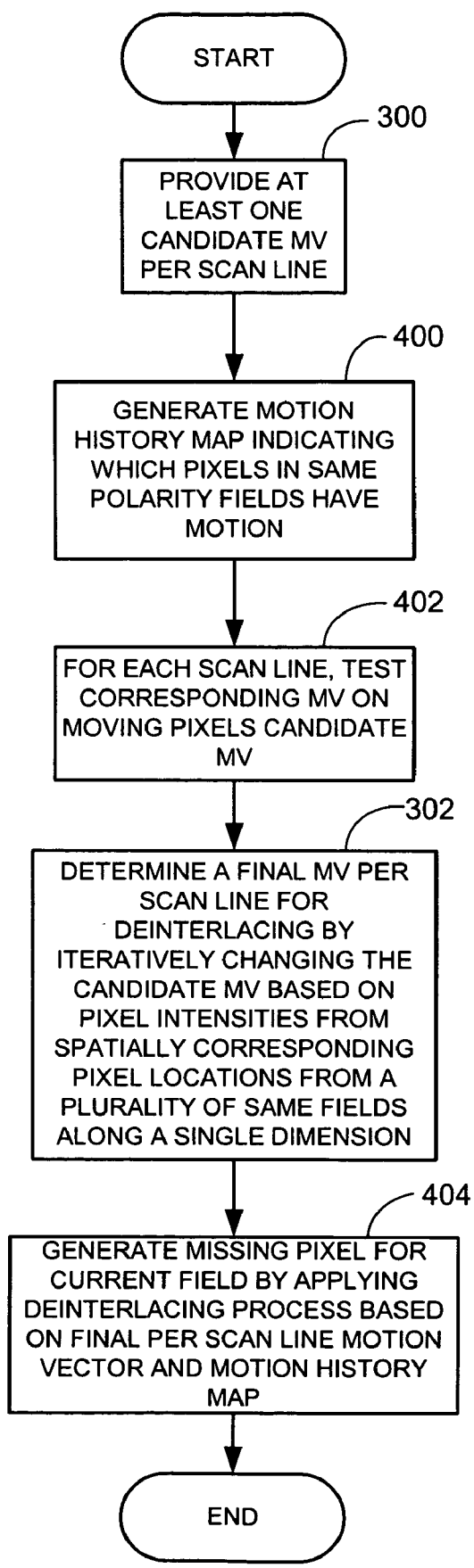
FIG. 4 is a flow chart illustrating one example of a method for deinterlacing interlaced fields of video in accordance with one embodiment of the invention.

FIG. 4 illustrates in more detail a method for deinterlacing interlaced fields of video wherein in addition to the steps noted with respect to FIG. 3, the method includes generating motion history map 20 as noted above indicating which pixels in the field are believed to contain motion as shown in block 400. One methodology for determining whether motion may exist for a pixel may be determined for example by comparing every pair of spatially corresponding pixels (one from each same polarity field) to determine if their intensities are comparable. If the intensities differ by more than typical analog noise can account for, motion may be assumed. The control logic 14 applies the candidate motion vector 16 for example on those pixels in a scan line determined to have motion in the previous field to obtain a new reference pixel 208 replacing the original pixel from the older field. The original pixel and new reference pixel are compared again and if their intensities are comparable (within a desired range) counters may be incremented and decremented. This process is repeated for all scan lines having pixels with motion or a group of scan lines. This is further described below.

As shown in block 402, the method includes, for each scan line in a field, testing the candidate motion vector to see if the candidate motion vector 16 is the correct or suitable final motion vector 28 to apply for a given scan line during a deinterlacing process. For example, the control logic 14 or any other suitable element or elements may apply the per scan line candidate motion vector 16 to spatially translate pixels in one dimension in a first field, such as a previous field, to produce motion vector compensated pixels 210. The produced motion vector compensated pixel 210 is then compared to the reference pixel intensity of the corresponding pixel in the next field. For example, the reference pixel intensity may be represented as a pixel intensity associated with pixel located at X", Y" in a next field (see FIG. 2). Comparing the produced motion compensated pixel 210 to the reference pixel intensity for pixel located at X", Y" for example will result in data on a per pixel basis for each scan line to determine whether the candidate motion vector is the valid motion vector to apply for an entire scan line. If the candidate motion vector 16 when applied to produce the motion compensated pixel 210 results in an intensity value that is different beyond any desirable amount from the reference pixel intensity, a new and different candidate motion vector is selected and the process is repeated until a suitable motion vector that meets desired criteria is obtained on a per scan line basis.

As shown in block 302, once the final motion vector is determined the method includes, as shown in block 404, generating the missing pixels for a current field by applying the deinterlacing process based on the final per scan line motion vector and the motion history map 210 such that the final motion vector 28 is applied to pixels shown to contain motion as defined by the motion history map 20. It will be recognized that the same motion vector for multiple scan lines may be used and that in the situation where horizontal scrolling quotes are being displayed, the control logic 14 may for example compare a common motion vector associated with a band of neighboring scan lines and may assign a common per scan line motion vector to the band or to any scan lines that have different per scan line motion vectors from others in the band to filter out inconsistent motion vectors on a per scan line basis. As such, a band (or group) of scan lines may use the same motion vector which may occur, for example, where horizontal scrolling letters make up a fixed number of scan lines on a screen. However, it may also be desirable to provide a different motion vector for differing scan lines even though they may be neighboring scan lines.

It will also be recognized that although the description herein is being described primarily with respect to a per scan line motion vectors in the horizontal dimension, the techniques described herein may also be applied to scan lines that are defined as being in the vertical dimension.

FIG. 5 illustrates in more detail a method for deinterlacing interlaced fields of video for display in a progressive display device which further sets forth methods to test the candidate motion vector to see if it is a correct motion vector for a given scan line. As such, the control logic 14 or any other structure(s) to test a candidate motion vector may apply the candidate per scan line candidate motion vector to spatially corresponding pixels in one dimension in a previous field for example to produce motion vector compensated pixels associated with a next field which is of a same polarity and compare the produced motion compensated pixel to for example an original pixel intensity associated with the spatially corresponding pixel in the next field to produce data such as per pixel statistics on a per scan line basis to determine validity of the candidate motion vector as noted above. The statistics may be, for example, statistics associated with each pixel in a scan line that was thought to have motion after a candidate motion vector has been applied to the pixel at those locations.

For example, referring back to FIG. 1, the control logic 14 includes counters (see e.g. FIG. 6) for each scan line. The resulting per scan line values 30, 32 and 34 are stored in memory block 22. The plurality of counters may accumulate data that results from the comparison of corresponding motion compensated pixels to pixel intensities at that same location. As such, as shown in FIG. 5 the method includes as shown in block 500, determining at least one per scan line value, and in a preferred embodiment, this includes three different per scan values 30, 32 and 34 referred to as a difference count (diff_cnt), same count (same_cnt) and sum of absolute differences respectively. Each of these per scan line values 30, 32, 34 may be based on a comparison of the produced motion compensated pixels to pixel intensities associated with spatially corresponding pixels in the next same polarity field. These per scan line values are used to determine whether or not the current candidate motion vector is a suitable motion vector or if a new candidate motion vector needs to be used. For example, as shown in block 502 the method includes determining if an optimal motion vector is detected. This may be done for example by determining that all of the motion compensated pixel intensities in a scan line are close enough in value to the reference pixel intensity, in one example a reference pixel value located at that same location for all pixels determined to have motion in a given scan line. The memory 22 also includes previous per scan line values 36, 38 and 40 respectively that are previous diff_cnt, same_cnt and sum of absolute diff values. These are used to check which new candidate motion vector should be selected. For example, a linear or fixed increment or decrement in motion vector value can be used or a non-linear increment/decrement approach can be used. By comparing the statistics in two different tests, the control unit can tell if the new candidate is a better or a worse guess and can modify the search strategy.

If so, as shown in block 302 it is determined if the optimal motion vector detected is in fact the final motion vector for the scan line. For example, the system and method may check across multiple neighboring scan lines and use a band selection approach as noted above if one of say four neighboring scan lines in a group has a different optimal motion vector than one that is considered to be different. The different motion vector value may be changed to match those of the others in the band for the next test. The fields are then deinterlaced using the final motion vector associated with each scan line.

As shown in block 504, a new motion vector is provided for the next incoming field or to fine tune and the method may include continuing validation of the "final" motion vector. For example, once a "final" motion vector is determined, another iteration may be performed to select yet a different motion vector that might be relatively close in value to the final motion vector but different enough to determine whether or not an even closer approximation would result in a more accurate motion vector.

Referring back to block 502, if an optimal motion vector is not detected, the method includes providing a new scan line candidate motion vector, as shown in block 506 based on the per scan line value that was produced during the test process. In a preferred embodiment, the per scan line value that indicates whether or not a new candidate motion vector should be used is the per scan line difference count (e.g. value 36) as described below. For example, in a preferred embodiment, the per scan line values include as noted above three specific types of per scan line values.

FIG. 6 is a block diagram illustrating one embodiment of an apparatus for deinterlacing interlaced fields that employs for example as the control logic, a processor 600 and coprocessor 602 wherein the processor 600 may be, for example, a host CPU executing a software program such as a graphics driver, and the coprocessor 602 may be a graphics coprocessor with a suitable programmable shader 604 as known in the art. One such suitable graphics processor may be one of the RADION™ graphics processors available from ATI Technologies Inc. Toronto, Canada. However it will be recognized that any suitable processing devices may be used. In this example, a driver, such as program instructions are stored in memory 606 or any suitable memory that cause the processor 600 to provide at least one candidate motion vector per scan line and determine the final motion vector per scan line for deinterlacing. The final motion vector and the candidate motion vectors are provided for example to the processor 602 under control of the processor 600. As such, for example a programmable shader 604 may include deinterlacing logic which uses the final motion vector as determined by the processor 600. In this example, the motion history map is populated by for example the graphics processor 602 and accessed by the graphics processor 602 for use by the deinterlacer 604. The per scan line candidate motion vectors are accessible from memory to the graphics processor 602 and may be provided (e.g. stored) by the processor 600 under driver control. The count values 30, 32 and 34 as described above such as the per scan line values are provided by the graphics processor in this example to memory (such as registers) that are accessible by the processor 600. The processor 600 may then determine the final motion vector per scan line and submit the final motion vector to the deinterlacer 604 to carry out the deinterlacing. In this example the coprocessor 602 includes counters 608, 610 and 612 that produce respective per scan line values 30, 32 and 34. Accordingly, there is a per scan line difference count (e.g. 30), per scan line same count (e.g. 34) and per scan line sum of absolute differences count (e.g. 36) and associated counters 608, 610 and 612 and memory 36, 38 and 40 that store previous per scan values that were generated based on the previously used motion vectors. As such previous difference counts, previous same counts and previous sum of difference counts are also stored so that the method and system can determine whether or not the counts are increasing or decreasing over time to determine not only the next candidate to test against but also if the candidate motion vector is optimal and suitable for deinterlacing.

As such, multiple processors are utilized which perform differing operations to more efficiently carry out the deinterlacing process as described herein. However, it will also be recognized that operations described herein may be carried out by either of the processors 600 or 602 as desired. Each counter 30-34 produces a per scan line value 36, 38 and 40 respectively. In a preferred embodiment, the control logic 14 uses the per scan line value counter 30 to generate a per scan line value 36 that represents a number of pairs of spatially corresponding pixels that have an unacceptable pixel intensity difference (diff_cnt). The per scan line value counter 32 generates a per scan line value 38 representing a number of pairs of spatially corresponding pixels that have an acceptable pixel intensity difference (same_cnt) and the per scan line counter 34 (e.g. an accumulator) generates a sum of absolute differences, per scan line, based on the per scan line values 38 and 36. The sum of absolute differences value is shown as value 40. As such, the counter 30 includes one per scan line value, the counter 32 contains another per scan line value and counter 34 which serves as an accumulator contains the sum of absolute differences of the values 36 and 38.

The counters may be discrete logic and not memory elements and instead may be adders as known in the art and the memory 22 then stores the resulting values. The per scan line value counters are provided for each scan line in a field and the per scan line sum of differences counter 34 includes a plurality of counters one for each scan line of interest. In this case it is for each scan line in a field.

In operation, the control logic 14 may also include the counters and then store the resulting values in memory 22 if desired. It will be recognized that any suitable structure can be used. In any event, in one example, the same count value and different count values are incremented as follows. Once the candidate motion vector has been applied to a pixel of interest to obtain a motion compensated pixel, it is compared with the reference pixel intensity in the neighboring field. If the intensities are comparable, meaning for example they are within a desired range, the same count counter is incremented, otherwise the difference count is incremented. This process is repeated for each pixel determined to have motion, and the scan line and the selected motion vector is applied to each of these pixels with motion. The absolute differences of pixels with motion are then accumulated in the per scan line sum of differences counter 34. As such there are two counters for every scan line for example and an accumulator for every scan line. If the corresponding difference count is very small and the same count is large then it is assumed for example that the given motion vector candidate is acceptable. Once an acceptable motion vector is identified, the sum of absolute difference values will be employed in the refinement process. At the same time, the deinterlacer is then sent the motion candidate as the final motion vector and performs motion compensated deinterlacing for the moving pixels in the scan line. The control logic reuses the same motion candidate for the scan line on the arrival of the next same polarity field assuming that most motion is constant.

On the other hand, if the difference count value is large then the motion vector candidate is determined to be inappropriate or at least it is not a motion common to all moving pixels in the same scan line. A non-motion compensated technique may then be applied to restore moving pixels in the scan line. The control logic then selects a new motion candidate for the scan line on the arrival of the next field of same polarity.

In the instance where no suitable motion vector is detected on a scan line, the control logic adjusts the motion vector candidate for the next iteration. Choosing the next motion vector may be done using preselected increments or determined knowledge about neighboring scan lines or neighboring fields or any other suitable criteria. For example, it can be assumed that it was successfully detected on a neighboring scan line based on the locality of a current scan line and the assumption that the area of motion is uniform and large, the same motion vector can be applied to multiple can lines.

The above methods and structure provide, among other advantages, single dimension deinterlacing and using a common motion vector for each scan line. Such a process can speed up motion detection and provide suitable image quality for, among other moving advantages such as horizontally moving quote symbols or any other suitable moving images. As such, horizontal scrolling text may be suitably deinterlaced with good image quality using the above techniques and structure. Other advantages will be recognized by those of ordinary skill in the art.

Also it will be recognized that out where on screen text may be overlaid for example on top of video that the underlying video and overlaid text may have motion at different rates or may have motion in different directions so the deinterlacer may use different motion vectors on a per pixel basis and apply vectors on a per pixel basis as opposed to a per scan line basis if necessary to further improve image resolution. For example, the programmable shader of a 3D graphics engine may generate a mask of which scan lines should use which motion vectors if for example the common motion vectors is to be used on a per scan line basis.

As described above, it will be recognized that the motion search area may also be reduced by selecting the bottom third or top third of a display screen where ticker symbols are likely to appear. In addition, it will be recognized that the above methodology utilizes a one dimensional search for example pixel by pixel in either the horizontal or the vertical direction. It is beneficial to assume for example that motion is in one direction and to accumulate the motion results. If a majority of the motion compensated pixels (those where candidate motion vector have been applied prior to deinterlacing) if the majority of these are correct then the motion vector that has been selected, per scan line, can assume to be a suitable candidate. It will also be recognized that signed motion vectors may be used to indicate direction so that it can be determined whether or not the candidate motion vector is of a suitable sign which indicates for example motion in a right direction versus a left direction. The per scan line counters effectively count how many pixels agree with a tested motion vector. The sum of absolute difference value is in effect used to, in one example, improve locking onto the optimal motion vector. In one embodiment, the counters are filled in for the entire field and the process is repeated for the same field until a test motion vector or vectors are acceptable.

By way of example, where a driver is executed for example by a processor, and a coprocessor carries out the deinterlacing, the processor may evaluate the same count value and if it is high and the difference count value is low then the processor assumes that the motion vector is in the right direction. If the same count value is low and the difference count value is high then a test is made to determine if the motion vector is in the wrong direction. The sum of absolute difference value is accumulated preferably, only after the candidate motion vector is believed to be close to the final value. For example, if a desired motion vector accuracy is such that it is determined that if for example if less than three percent of the pixels (the difference count) indicate a suitable motion vector then the sum of absolute difference value is evaluated to indicate if the value is at a desired level. For example the sum of absolute difference value can be used to confirm whether or not the motion vector as selected is optimal. In can be used for example to determine to verify once you have selected a motion vector to confirm that the sum of absolute differences has been minimized. In essence it is a fine tuning tool in determining the best motion vector for deinterlacing.

Stated another way, the difference count and same count are analyzed to determine if the candidate motion vector that has been selected is changing in a proper direction or not. For example, if the same count is increasing while the difference count is decreasing, then it is assumed that the candidate motion vector is better than the previous candidate, i.e., the search is moving in a proper direction. If the same count is decreasing and the difference count is increasing, then it is assumed that the search for the optimal motion vector has been done in the wrong direction.

The sum of absolute difference value is evaluated when for example a minimum which then indicates for example that the motion vector selected is suitable. For example, it may be desirable to continue changing the candidate motion vector around the known-to-be-optimal vector to confirm that it is the best selection for the scan line. It may be desirable for example to iterate for example between a −1, 0, and +1 of a motion vector in use. This may assist in fine tuning the motion vector value. In addition, we need to switch back to the search phase if the difference count value increases dramatically, which will happen at a scene change.

When applying deinterlacing, to moving pixels indicated by the history map, the deinterlacer notes that if there is zero motion then a weave operation may be applied, if there is a motion vector that has been selected then a motion correct weave is applied otherwise a bob deinterlacing approach may be used. However it will be recognized that any suitable deinterlacing technique may be used.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method of de-interlacing interlaced fields of video for display on a progressive display device comprising:
    (a) providing at least one candidate motion vector per scan line; and (b) determining at least one final motion vector per scan line of interlaced video for use in de-interlacing the interlaced fields, by iteratively changing the at least one candidate motion vector per scan line based on pixel intensities from each of a plurality of same polarity fields at locations along a single dimension.

2. The method of claim 1 wherein determining, at least one final motion vector per scan line of interlaced video for use in de-interlacing the interlaced fields, includes:

(c) storing data representing a previous field and data representing a next field of the same polarity as the previous field;

(d) applying the at least one per scan line candidate motion vector to spatially corresponding pixels in one dimension in a first field, to produce motion vector compensated pixels associated with a second field and same polarity field;

(e) determining at least one per scan line value based on the comparison of the produced motion compensated pixels to pixel intensities associated with spatially corresponding pixels in the second same polarity field; and (f) providing a new candidate motion vector in response to the at least one per scan line value.

3. The method of claim 2 including confirming that the new candidate is the final per scan line motion vector by providing another candidate motion vector and repeating steps (d)-(f) such that if the per scan line value becomes more undesirable the new candidate motion vector is selected as the at least one final per scan line motion vector.

4. The method of claim 2 including generating a motion history map on a per pixel basis and de-interlacing pixels from at least the first and second fields using the at least one final motion vector per scan line for at least a plurality of pixels determined to have motion in the scan line based on the motion history map.

5. The method of claim 2 wherein determining at least one per scan line value based on the comparison of the produced motion compensated pixels to pixel intensities associated with spatially corresponding pixels in the second same polarity field includes:

generating a first per scan line value representing a number of pairs of spatially corresponding pixels that have an unacceptable pixel intensity difference;

generating a second per scan line value representing a number of pairs of spatially corresponding pixels that have an acceptable pixel intensity similarity; and generating a sum of absolute differences based on the first and second cumulative difference count values.

6. The method of claim 5 including storing the first and second per scan line values and the sum of absolute differences for each scan line of interest.

7. The method of claim 1 including applying the at least one final per scan line motion vector to either a next field or a new incoming field.

8. The method of claim 1 including, after the final motion vectors are selected for all scan lines, the method includes assigning a common scan line motion vector to any scan lines in the band of neighboring scan lines that have different per scan line motion vectors from the common scan line motion vector.

9. An apparatus for de-interlacing interlaced fields of video for display on a progressive display device comprising:

a frame buffer containing at least a plurality of same polarity fields;

control logic, operatively coupled to the frame buffer, and operative to provide at least one candidate motion vector per scan line, and to determine at least one final motion vector per scan line of interlaced video for use in de-interlacing the interlaced fields, by iteratively changing the at least one candidate motion vector per scan line based on pixel intensities from each of a plurality of same polarity fields at locations along a single dimension.

10. The apparatus of claim 9 wherein the plurality of same field in the frame buffer includes data representing a previous field of the same polarity and data representing a next field of the same polarity, and wherein the control logic is operative to:

(a) apply the at least one per scan line candidate motion vector to spatially corresponding pixels in one dimension in a first field, to produce motion vector compensated pixels associated with a second same polarity field;

(b) determine at least one per scan line value based on the comparison of the produced motion compensated pixels to pixel intensities associated with spatially corresponding pixels in the second same polarity field; and (c) provide a new candidate motion vector in response to the at least one per scan line value.

11. The apparatus of claim 10 where the control logic is operative to confirm that the new candidate is the at least one final per scan line motion vector by providing another candidate motion vector and is operative to repeat operations (a)-(c) such that if the at least one per scan line value becomes more undesirable the new candidate motion vector is selected as the final per scan line motion vector.

12. The apparatus of claim 10 wherein the control logic generates a motion history map on a per pixel basis and wherein the apparatus includes a de-interlacer that de-interlaces pixels from at least the first and second fields using the at least one final motion vector per scan line for at least a plurality of pixels determined to have motion in the scan line.

13. The apparatus of claim 10 wherein the control logic is operative to:

generate a first per scan line value representing a number of pairs of spatially corresponding pixels that have an unacceptable pixel intensity difference;

generate a second per scan line value representing a number of pairs of spatially corresponding pixels that have an acceptable pixel intensity difference; and generate a sum of absolute differences, per scan line, based on the first and second per scan line values.

14. The apparatus of claim 13 including, for each scan line:

a first counter that contains the first per scan line value;

a second counter that contains the second per scan line value; and an accumulator that contains the sum of absolute differences based on the first and second per scan line values.

15. The apparatus of claim 10 wherein the scan line is a scan line associated with either a vertical direction or a horizontal direction.

16. The apparatus of claim 9 wherein the control logic is operative to apply the at least one final per scan line motion vector to either a next field or a new incoming field.

17. The apparatus of claim 9 wherein the control logic is operative to, after the final motion vectors are selected for all scan lines, assigning a common scan line motion vector to any scan lines in the band of neighboring scan lines that have different per scan line motion vectors from the common scan line motion vector.

* * * * *